No. 885,738. PATENTED APR. 28, 1908.
J. DOWLING.
SAW.
APPLICATION FILED JUNE 29, 1906. RENEWED JULY 19, 1907.
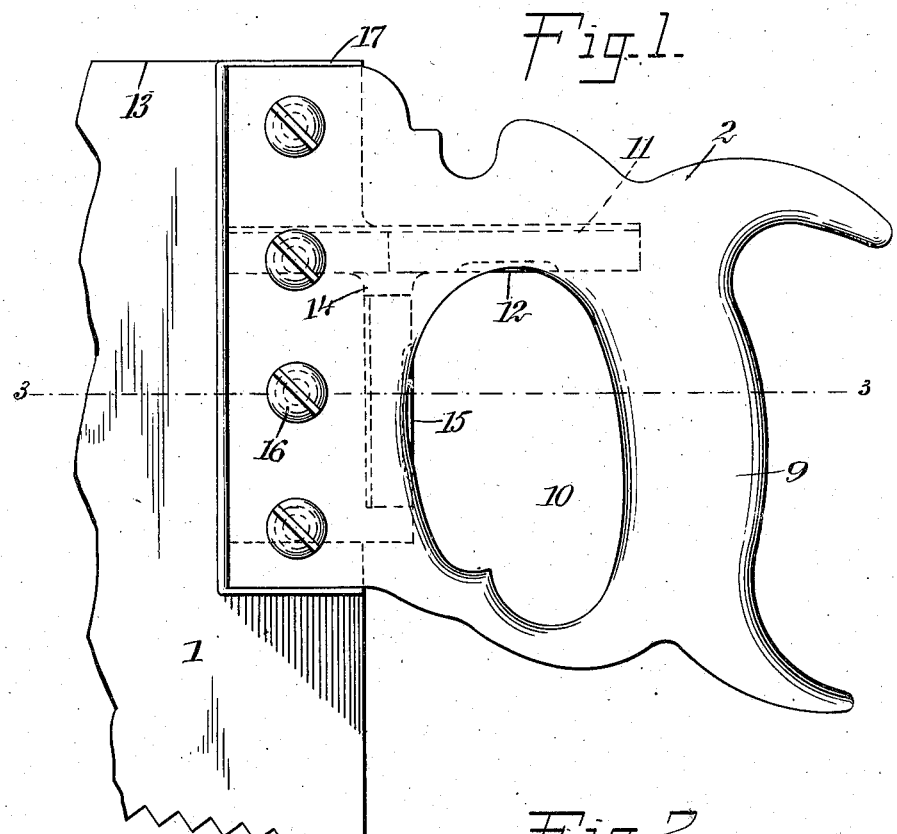
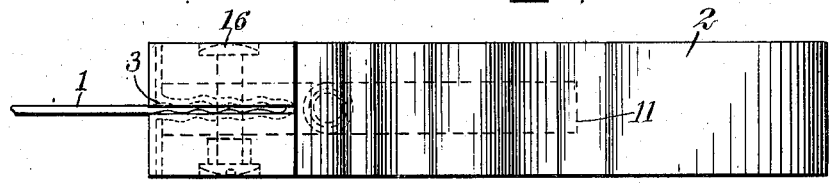
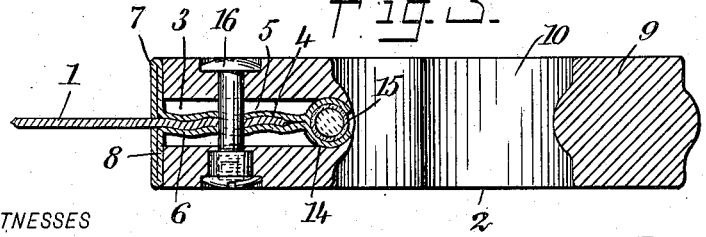
WITNESSES
INVENTOR
John Dowling
BY
ATTORNEYS

UNITED STATES PATENT OFFICE.

JOHN DOWLING, OF OLYMPIA, WASHINGTON.

SAW.

No. 885,738.

Specification of Letters Patent.   Patented April 28, 1908.

Application filed June 29, 1906, Serial No. 324,013. Renewed July 19, 1907. Serial No. 384,612.

*To all whom it may concern:*

Be it known that I, JOHN DOWLING, a citizen of the United States, and a resident of Olympia, in the county of Thurston and State of Washington, have invented a new and Improved Saw, of which the following is a full, clear, and exact description.

This invention relates to saws such as used by carpenters.

The object of the invention is to provide a saw with improved means for attaching the handle to the butt thereof, and to provide the handle with spirit levels, the arrangement being such that the said spirit levels are protected from injury.

A further object of the invention is to construct the parts so that the spirit levels will be accurately alined with respect to the rear edge of the saw blade, which constitutes a straight edge.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a saw handle constructed according to my invention, and showing a portion of the blade to which the same is attached; Fig. 2 is a plan or edge view of the saw handle and rear portion of the blade; and Fig. 3 is a cross section on the line 3—3 of Fig. 1.

Referring more particularly to the parts, 1 represents the butt of the saw blade; the handle 2, before being attached to the saw blade, is provided at its forward portion with a vertical mortise or slot 3. In this slot there is received a keeper 4, which keeper is formed of sheet metal folded so as to present opposite plates 5 and 6 which are corrugated as shown. In the space between these plates 5 and 6, the butt of the saw is received as shown in Fig. 3, and this part of the saw is provided with corrugations, as indicated, conforming to the shape of the plates, as will be readily understood. At the forward edges, the plates 5 and 6 are formed with laterally projecting flanges 7 which are produced by doubling the metal upon itself as indicated, the said flanges 7 being arranged so that they cover the forward face 8 of the saw handle as shown. The saw handle 2 is formed with the usual grip 9 and eye 10.

Near its upper portion, the keeper 4 is formed with a rearwardly projecting tubular extension or case 11, and within this extension there is mounted a spirit level 12. The handle is suitably bored so that when the parts are seated, the middle portion of the spirit level 12 will be just visible at the edge of the eye 10 as shown in Fig. 1. This spirit level 12 is mounted with its longitudinal axis parallel with the rear edge 13 of the saw blade, which constitutes a straight edge. The rear portion of the keeper is formed into a similar tubular case 14 within which there is mounted a spirit level 15, the longitudinal axis of this spirit level being at right angles to the straight edge 13. The handle is suitably recessed so as to permit the tubular case 14 to be seated as indicated in Fig. 1, with the middle portion of the spirit level 15 exposed at the forward edge of the eye 10. The keeper and the blade are firmly held in the handle by means of screw bolts 16 which pass through the parts at the forward portion of the handle as indicated. At the upper and lower extremities of the flanges 7, the outer fold of the material is bent so as to extend rearwardly to form cap flanges 17 which seat upon the upper and lower faces of the handle as indicated. These cap flanges increase the security of the keeper and blade on the handle.

With a saw constructed as described, it should be understood that if the straight edge 13 at the back of the saw blade is applied to a horizontal surface, the spirit level 12 will indicate whether this surface is perfectly level or horizontal; likewise, if the rear edge of the saw blade is applied to a vertical member, the spirit level 15 will indicate whether this member is truly vertical. By reason of the position of the spirit levels, they are well protected from injury in case the saw should fall in such a way that the handle is struck. By reason of the corrugations of the blade and the keeper, it becomes impossible for the angular position of the keeper to shift materially with respect to the rear edge 13 of the saw blade, and on this account the spirit levels will remain in accurate alinement with respect to the saw blade.

Having thus described my invention, I claim as new and desire to secure by Letters Patent:

1. A saw having a handle with an eye, a blade, a keeper of sheet metal bent to form a tubular case at the rear and presenting forwardly projecting plates clamping said blade therebetween, said plates and said blade having corrugations holding said keeper in a fixed angular relation with respect to said blade a spirit level received in said case, said handle having a recess receiving said keeper and case and exposing said spirit level on the edge of said eye.

2. A saw having a handle with an eye, a blade, a keeper of sheet metal bent to form a tubular case at the rear and presenting forwardly projecting plates clamping said blade therebetween, said plates and said blade having corrugations holding said keeper in a fixed angular relation with respect to said blade a spirit level received in said case, said handle having a recess receiving said keeper and case and exposing said spirit level on the edge of said eye, a second tubular case projecting rearwardly from said keeper at right angles to said first case and carrying a second spirit level exposed at said eye, said handle having a bore in which said second case is received.

3. A saw having a handle with an eye, a blade, a keeper of sheet metal bent to form a vertical tubular case at the rear, and presenting forwardly projecting plates between which the butt of the saw blade is secured, a spirit level in said case, said handle having a vertical slot or recess in its forward portion adapted to receive said keeper and case, the said slot opening at its rear at the edge of said eye to expose said spirit level, and a second tubular case projecting rearwardly from the upper portion of said keeper at right angles to said first case and carrying a second spirit level, said handle having a bore in which said second case is secured, said bore opening at the edge of the eye to expose the spirit level.

4. A saw having a handle with an eye therein, the handle being provided with a slot at its forward portion, a keeper mounted in said slot and constructed of sheet metal bent to form opposite plates between which the butt of the saw blade is received, said keeper having an integral case carrying a spirit level visible at the edge of said eye, the plates of the keeper at the forward edges being formed with laterally projecting flanges arranged to cover the forward face of the saw handle, and cap flanges at the upper and lower extremities of said first mentioned flanges and arranged to seat upon the upper and lower faces of said handle.

5. A saw having a handle with an eye, a blade, a keeper formed of sheet metal and folded to present opposite plates between which the saw blade is clamped, the said keeper having at its upper portion a rearwardly projecting tubular extension or case carrying a spirit level, the keeper being further provided at its rear portion with a similar tubular case extending vertically or at right angles to the first case and carrying a second spirit level, the handle having a vertical slot or recess at its forward portion adapted to receive the keeper and vertical tubular case, the handle also having a bore to receive the rearwardly extending tubular case, the recess and bore opening at the edge of the eye to expose the spirit levels, the said keeper having flanges at its forward portion adapted to cover the forward face of the saw handle, and cap flanges adapted to seat upon the upper and lower faces of said handle.

6. A saw having a straight edge, a keeper having forwardly projecting plates between which the blade is secured, spirit levels carried by said keeper one of which is parallel with the straight edge of the saw blade and the other at right angles thereto, a handle recessed and bored to receive the keeper and spirit levels, and bolts extending through the handle the forwardly projecting plates of the keeper and the saw blade.

7. A saw having a straight edge, a keeper of sheet metal having forwardly projecting plates between which the saw blade is received, and means for holding said keeper in fixed angular relation with respect to said blade, the said keeper having tubular casings extending at right angles to each other and carrying spirit levels coacting with said straight edge.

In testimony whereof I have signed my name to this specification in the presence of two subscribing witnesses.

JOHN DOWLING.

Witnesses:
H. C. MATSON,
G. H. BARRY.